United States Patent
Goto et al.

(10) Patent No.: US 11,415,152 B2
(45) Date of Patent: Aug. 16, 2022

(54) SYSTEM FOR REDUCING INTERFERENCE NOISE OF ROTOR AND STATOR BLADES, AND FLIGHT VEHICLE

(71) Applicant: KABUSHIKI KAISHA TOSHIBA, Minato-ku (JP)

(72) Inventors: Tatsuhiko Goto, Kawasaki (JP); Akihiko Enamito, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 434 days.

(21) Appl. No.: 16/555,596

(22) Filed: Aug. 29, 2019

(65) Prior Publication Data
US 2020/0291964 A1 Sep. 17, 2020

(30) Foreign Application Priority Data
Mar. 12, 2019 (JP) .............................. JP2019-044826

(51) Int. Cl.
*F04D 29/66* (2006.01)
*G10K 11/178* (2006.01)
(Continued)

(52) U.S. Cl.
CPC ............ *F04D 29/665* (2013.01); *F02C 7/045* (2013.01); *G10K 11/17881* (2018.01);
(Continued)

(58) Field of Classification Search
CPC ...... F01D 21/003; F04D 29/665; F02C 7/045; B64D 33/02; B64D 2033/0206; B64C 2220/00; F05D 2260/962
See application file for complete search history.

(56) References Cited

U.S. PATENT DOCUMENTS 5,355,417 A 10/1994 Burdisso et al.
5,382,134 A 1/1995 Pla et al.
(Continued)

FOREIGN PATENT DOCUMENTS

GB 1 456 018 11/1976
JP 1-159406 A 6/1989
(Continued)

OTHER PUBLICATIONS

Yoshihisa Honda, et al., "Active Minimization of Blade Rotational Noise from an Axial Fan", Transactions of the Japan Society of Mechanical Engineers (Part C). vol. 59, No. 562, 92-1472, 1993-6, 19 pages (with English Translation).
(Continued)

*Primary Examiner* — David E Sosnowski
*Assistant Examiner* — Julian B Getachew
(74) *Attorney, Agent, or Firm* — Oblon, McClelland, Maier & Neustadt, L.L.P.

(57) ABSTRACT

According to one embodiment, a system for reducing interference noise of rotor and stator blades includes rotor blades, stator blades, loudspeakers, one or more reference microphones, and a controller. The rotor blades rotate about a central axis. The loudspeakers are discretely arranged on a circle that has a center positioned on the central axis. Each loudspeaker generates a control sound. The controller causes the loudspeakers to generate control sounds of a same phase and a same amplitude. The control sounds correspond to the loudspeakers. The r is selected based on a preset attenuation level concerning the interference noise, and the k, where a is a length of the rotor blades, b is a radius of the circle, r=a/b, k is an upper limit wavenumber.

9 Claims, 7 Drawing Sheets

(51) Int. Cl.
*F02C 7/045* (2006.01)
*B64D 33/02* (2006.01)

(52) U.S. Cl.
CPC ...... *B64D 33/02* (2013.01); *B64D 2033/0206* (2013.01); *F05D 2260/962* (2013.01)

(56) References Cited

U.S. PATENT DOCUMENTS

| | | |
|---|---|---|
| 5,478,199 A | 12/1995 | Gliebe |
| 5,515,444 A | 5/1996 | Burdisso et al. |
| 5,526,432 A | 6/1996 | Denenberg |
| 6,201,872 B1 | 3/2001 | Hersh et al. |
| 2018/0204561 A1 | 7/2018 | Goto et al. |
| 2019/0088244 A1 | 3/2019 | Goto et al. |
| 2019/0292983 A1 | 9/2019 | Goto et al. |

FOREIGN PATENT DOCUMENTS

| | | |
|---|---|---|
| JP | 1-128000 U | 8/1989 |
| JP | 11-502032 A | 2/1999 |
| JP | 9-511810 A | 11/1999 |
| JP | 2003-233133 A | 8/2003 |
| JP | 2018-111461 A | 7/2018 |
| JP | 2019-53197 A | 4/2019 |
| JP | 2019-164272 A | 9/2019 |
| WO | WO 95/11386 A1 | 4/1995 |
| WO | WO 2009/054429 A1 | 4/2009 |

OTHER PUBLICATIONS

Takuya Aoki, et al., "Active control of fan noise in free space based on spherical harmonic expansion", Journal of the Acoustical Society of Japan, vol. 59, No. 7, 2003, 26 pages (with English Translation).

Takuya Aoki, et al., "Theoretical study on active control of rotational noise source using discrete ring sound source", Journal of the Acoustical Society of Japan vol. 60, No. 11, 2004, 20 pages, (with English Translation).

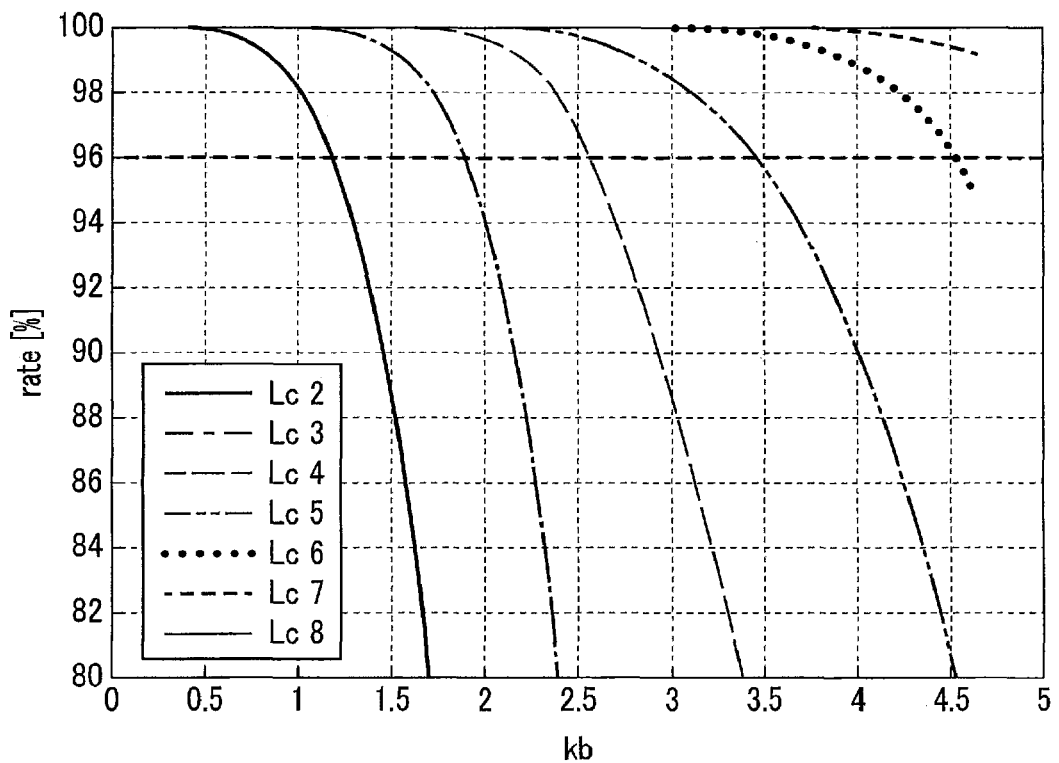
F I G. 3
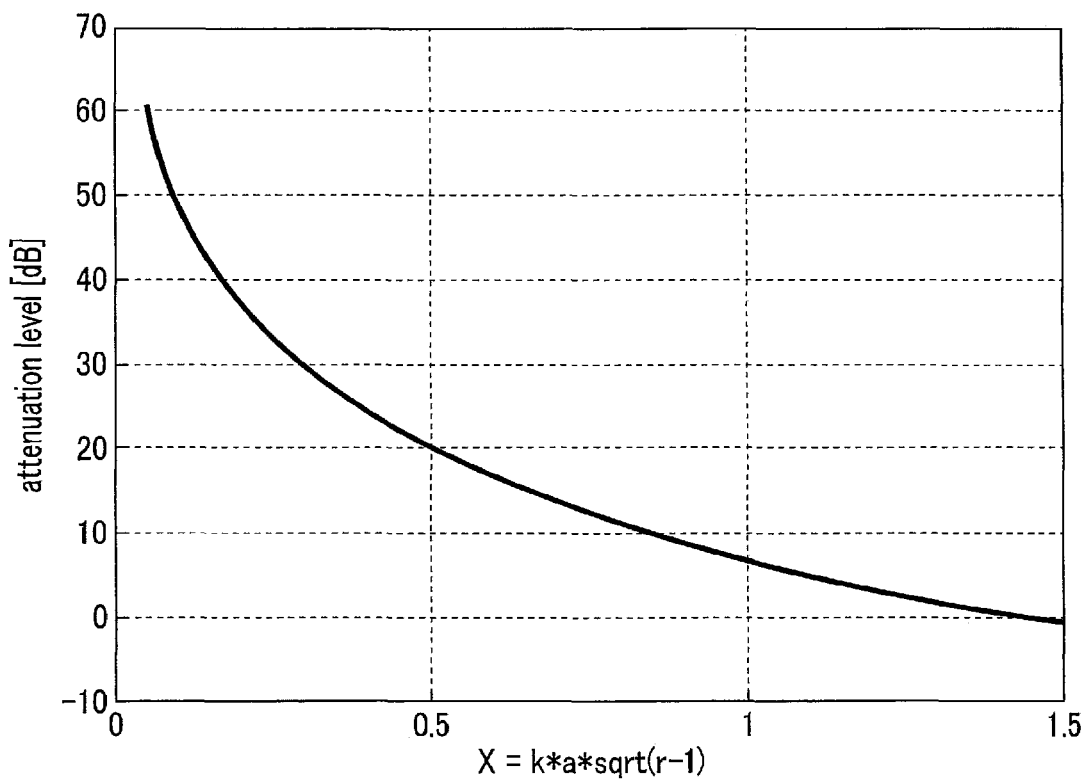
F I G. 4

SYSTEM FOR REDUCING INTERFERENCE NOISE OF ROTOR AND STATOR BLADES, AND FLIGHT VEHICLE

CROSS-REFERENCE TO RELATED APPLICATIONS

This application is based upon and claims the benefit of priority from Japanese Patent Application No. 2019-044826, filed Mar. 12, 2019, the entire contents of which are incorporated herein by reference.

FIELD

Embodiments described herein relate generally to a system for reducing the interference noise of rotor and stator blades, that is capable of reducing the interference noise, and to a flight vehicle including the system.

BACKGROUND

A blade noise is generally created from a rotating sound, an interfering sound, and a random sound. The frequencies of a rotating sound generated are multiples of a frequency obtained by multiplying the rotation speed by the number of blades. As a measure to reduce a rotating sound, it is common to widen a blade to thereby achieve uniform pressure distribution on the blade surface. An interfering sound is a noise generated by interference between a rotor blade and an interferer as typified by interference of rotor and stator blades, and where an occurrence frequency of a circumferentially-generated lobe mode increases as compared to a case where only a rotor blade is used. Therefore, inside a duct of an axial fan having a rotor blade and a stator blade, a low-order circumferentially-generated lobe mode that is not sufficiently attenuated is emitted from an end surface of the duct. A random sound is a wideband noise generated as an aerodynamic sound.

Active noise control (also referred to as "ANC") is known for active noise reduction of a rotational sound source generated by a rotor blade and the interference of rotor and stator blades. ANC outputs, from a control loudspeaker, a signal (control sound) having the same amplitude as that of noise and an opposite phase to that of noise, to thereby reduce noise.

The rotor blade and the stator blade are often installed in the duct. Also, when the interference of the rotor and stator blades occurs, the aforementioned low-order circumferentially-generated lobe mode is generated. Since the low-order circumferentially-generated lobe mode is emitted from the end surface of the duct to the outside without being attenuated in the duct, some noise reduction is needed.

BRIEF DESCRIPTION OF THE DRAWINGS

FIG. 3 is a graph showing a result of plotting the "rate" corresponding to each number of loudspeakers.

FIG. 4 is a graph showing a relationship between "att" and X.

FIG. 6 is a graph showing a relationship between Fbmax/Famax and b/a.

DETAILED DESCRIPTION

The embodiments disclosed herein aim at providing a system for reducing interference noise of rotor and stator blades that is capable of reducing the noise by lowering a low-order circumferentially-generated lobe mode.

According to one embodiment, a system for reducing interference noise of rotor and stator blades, the system includes a plurality of rotor blades, a plurality of stator blades, a plurality of loudspeakers, one or more reference microphones, and a controller. The rotor blades rotate about a central axis. The stator blades face the rotor blades. The loudspeakers are discretely arranged on a circle that has a center positioned on the central axis. Each loudspeakers generates a control sound. The controller causes the loudspeakers to generate control sounds of a same phase and a same amplitude based on one or more signals acquired by the one or more reference microphones. The control sounds correspond to the loudspeakers. An evaluation formula of an attenuation level "att" concerning the interference noise is represented by $$att = -20\log\left(\left|1 - \frac{j_0(1+X^2))}{j_0(1)}\right|\right) \quad \text{(Formula 1)}$$

and X is represented by $$X = ka\sqrt{r-1} \quad \text{(Formula 2)}$$

where a is a length of the rotor blades, b is a radius of the circle, r=a/b, k is an upper limit wavenumber, and $j_0$ is a spherical Bessel function, and the r is selected based on a preset "att", the X, and the k, the preset "att" being determined as a target noise attenuation level.

Figure 1:
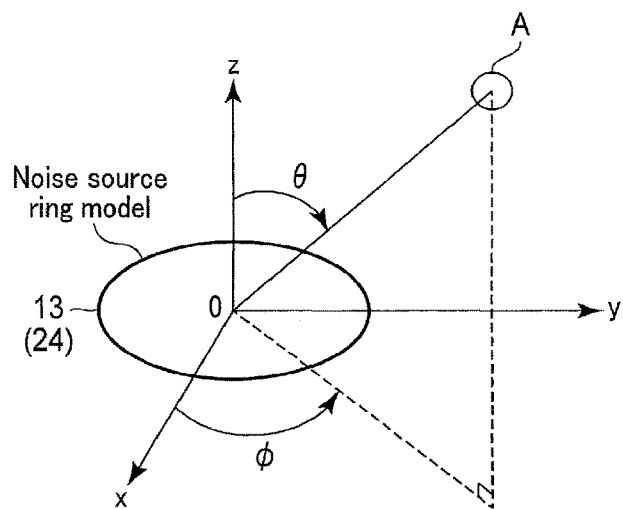
FIG. 1 is a diagram showing a three-dimensional polar coordinate system corresponding to each embodiment.

Hereinafter, the three-dimensional polar coordinates shown in FIG. 1 are used. In the three-dimensional polar coordinates shown in FIG. 1, a direction in which the rotation axis (central axis 12) of a rotor blade 13 is on the axis Z, a plane on which the rotor blade 13 is provided is the plane XY, an orientation within the plane XY, namely, an angle from the axis X is the orientation angle ϕ, and an angle of a target object A (e.g., reference microphone 17, etc.) from the axis Z is the elevation angle θ. A system 11 for reducing interference noise of rotor and stator blades of the embodiments described below is installed, for example, near a fan or a propeller of a flight vehicle 10.

First Embodiment

The system for reducing interference noise of rotor and stator blades and a flight vehicle including the system of the first embodiment will be described with reference to FIGS. 2 to 6.

Figure 2:
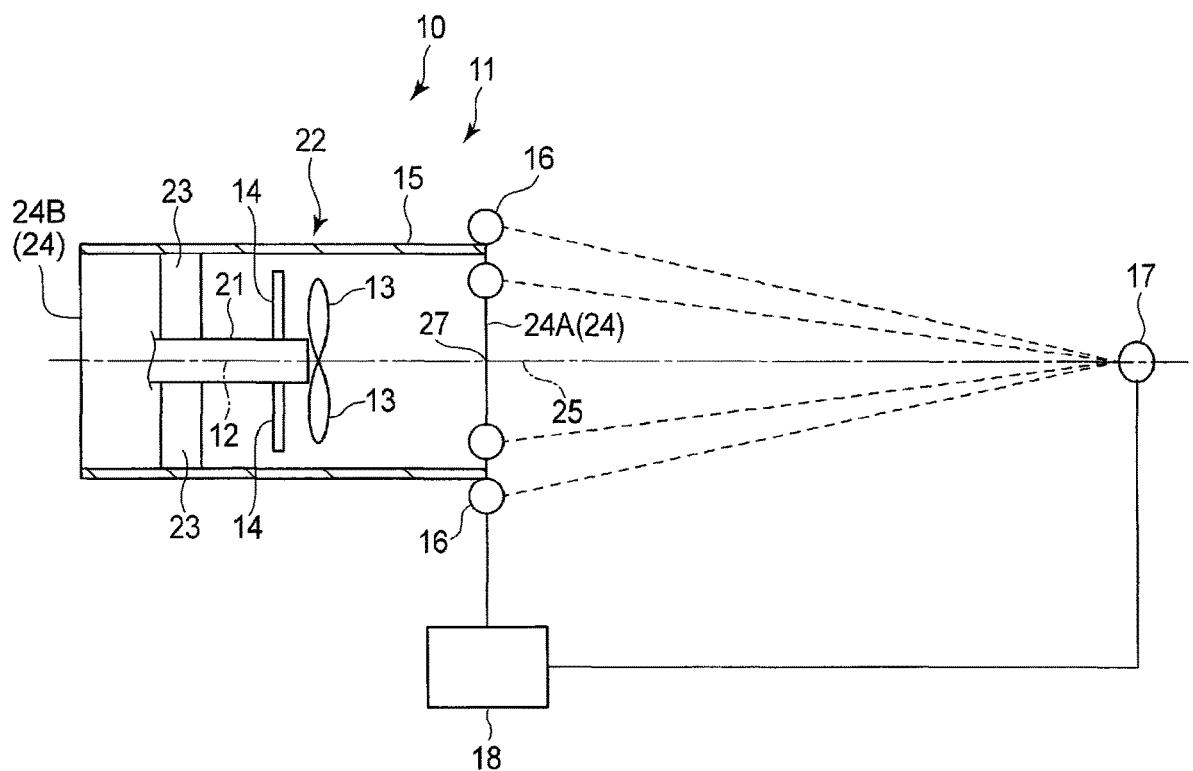
FIG. 2 is a schematic diagram showing rotor blades, stator blades, a duct, loudspeakers, a reference microphone, and a controller of a system for reducing interference noise of rotor and stator blades of a first embodiment.

As shown in FIG. 2, the flight vehicle 10 of the first embodiment includes the system 11 for reducing interference noise of rotor and stator blades. The flight vehicle 10 is, for example, an airplane (passenger airplane); however, it may be a drone, a helicopter, or the like.

The system 11 for reducing interference noise of rotor and stator blades includes: a central axis 12 (rotary shaft 21); rotor blades 13 that rotate about the central axis 12; stator blades 14 facing the rotor blades 13; a tubular (cylindrical) duct 15 surrounding the rotor blades 13 and the stator blades 14; loudspeakers 16 (control loudspeakers); one or more reference microphones (microphones) 17 that acquire an interference noise emitted from the rotor blades 13 and the stator blades 14 and a control sound emitted from the loudspeakers 16; and a controller 18 that controls the loudspeakers 16. When the rotary shaft 21 to which the rotor blades 13 are attached are configured in a rod shape having a large diameter, as in the present embodiment, the central axis 12 is defined as an axis passing through the center of the rotary shaft 21.

The rotor blades 13 are, for example, rotationally driven so as to send a fluid in a desired direction. The plurality of stator blades 14 are installed so as to rectify the flow of exhaust air generated by the rotation of the rotor blades 13. The central axis 12, the rotor blades 13, the stator blades 14, and the duct 15 described above can form a part of a gas turbine engine (jet engine), an example of which is a fan 22 with a compressor. The fan 22 includes a stator 23 that rotatably supports the central axis 12.

The number of loudspeakers 16 is three or more. The loudspeakers 16 can generate control sounds of the same phase and amplitude. The loudspeakers 16 are directly fixed to an outer periphery of the duct 15 via a jig or another fixing member. The loudspeakers 16 are discretely arranged on a circle that has a center positioned on the central axis 12, or an extended line 25 of the central axis 12. The loudspeakers 16 are arranged on the circle with an equal space between them. In the present embodiment, the loudspeakers 16 are fixed to an outer periphery of the duct 15 via a jig or another fixing member. The loudspeakers 16 are preferably provided near or around an end surface 24 of the duct 15.

One or more reference microphones 17 are arranged at a position away from the rotor blades 13 at a predetermined distance on the extended line 25 of the central axis 12. In the present embodiment, the number of reference microphones 17 is preferably one. More specifically, the reference microphone 17 is arranged at a position that satisfies the following formula:

$$(L^2 = b^2)^{1/2} - L < \lambda/4 \quad \text{(Formula 3)}$$

where L is a distance from the end surface 24 of the duct 15 to the reference microphone 17, b is a radius of installation of the loudspeakers 16 (distance from the central axis 12 to the loudspeakers 16), and A is a minimum value of the wavelength of the sound waves of noise (interference sound) to be reduced. When the upper limit of the frequency of the noise (interference sound) to be reduced is set to, for example, 1 kHz, the minimum value of the wavelength of the noise (interference sound) to be reduced is determined from the following formula: C=λ×f (C representing a sound velocity). Accordingly, L is determined from the above formula 3.

The duct 15 includes a first end surface 24A forming an air inlet and a second end surface 24B forming an exhaust outlet.

The planar surface of the rotor blade 13 is defined by the rotor blade 13 that is rotating. The number of rotor blades 13 is arbitrary. The number of stator blades 14 is arbitrary, and may be the same as or different from the number of rotor blades 13. The controller 18 can drive the loudspeakers 16 and generate control sounds of the same phase and amplitude from the loudspeakers 16.

The controller 18 is formed of a general PC (personal computer). A filtered-x program, which is a publicly-known ANC algorithm, is installed in the controller 18. A control method using the filtered-x, which is an ANC algorithm, may be a feedback type or a feedforward type. The controller 18 can generate control sounds of the same phase and the same amplitude from the loudspeakers 16 based on one or more signals acquired by one or more reference microphones.

In the present embodiment, an effective control method that takes 0th-order circumferentially-generated lobe mode characteristics into consideration is employed. The sound source characteristic of the 0th-order circumferentially-generated lobe mode is that sound sources of the same phase are continuously arranged in a ring form on a circle having the central axis 12, or the extended line 25 thereof in the center (on a circle positioned on the end surface 24 of the duct 15) (FIG. 2 shows only two sound sources (rotor blade sound sources), but in reality an infinite number of sound sources are arranged on the circle having the central axis 12 in the center).

The mode generated by the loudspeakers 16 (control loudspeakers) discretely arranged on the circle has an m-mode in a circumferential direction and an n-mode in an elevation-angle direction. Furthermore, the m-mode generated by the loudspeakers 16 discretely arranged on one circle includes an additional lobe mode. On the other hand, the sound sources (rotor blade sound sources) that are continuously arranged on a circle having the central axis 12 or the extended line 25 thereof in the center do not include this additional lobe mode.

In the present embodiment, to simulate a sound source (rotor blade sound source) by the loudspeakers 16 discretely arranged, a loudspeaker 16 was used that suppresses the contribution of the additional lobe mode to 4% or less in the following contribution ratio evaluation, according to the following formula. In the present embodiment, to reduce a 0th-order circumferentially-generated lobe mode characteristic as noise, a 0th-order circumferentially-generated lobe mode of a rotor blade sound source (m=0) was simulated by the loudspeakers 16. The following formula was specified:

$$B_n^m = L_c k q_s \sqrt{\frac{2n+1}{4\pi}} \sqrt{\frac{(n-|m|)!}{(n+|m|)!}} \, j_n(kb) P_n^{|m|}(0) \quad \text{(Formula 4)}$$

where $L_c$ is the number of loudspeakers 16, k is an upper limit wavenumber, b is a radius of a circle where the loudspeakers 16 are installed, $q_s$ is a volume velocity of the loudspeakers 16, n is an elevation angle mode number, m is a lobe mode number, $j_n$, is a spherical Bessel function, P is an associated Legendre function. A "rate" was defined as follows:

$$\text{rate} = \sum_{j=0}^{na} |B_{0+2j}^0|^2 \Big/ \sum_{i=-ma}^{ma} \sum_{j=0}^{na} |B_{|L_c \times i|+2j}^{0+L_c \times i}|^2 \quad \text{(Formula 5)}$$

where na is a suitable integer representing an upper limit of the elevation angle mode, and ma is a suitable integer representing an upper limit of the lobe mode.

In the present embodiment, various conditions were set so that this "rate" was 96% or more (so that the contribution ratio of the additional lobe mode was 4% or less). A graph presenting this "rate" is shown in FIG. 3. It may be understood from FIG. 3 that when the loudspeakers 16 are used in the range of kb <1.9, the number of loudspeakers 16 may be three; when the loudspeakers 16 are used in the range of kb <.2.5, the number of loudspeakers 16 may be four; when the loudspeakers 16 are used in the range of kb <3.5, the number of loudspeakers 16 may be five; and when the loudspeakers 16 are used in the range of kb <4.5, the number of loudspeakers 16 may be six. This shows that the influence of the above-described additional lobe mode (additional aliasing mode) is suppressed to 4% or less, and that the 0th-order circumferentially-generated lobe mode of a rotor blade sound source can be simulated by the discretely-arranged loudspeakers 16. This evaluation formula of "rate" ≥96% is very effective as an index for easily calculating the suitable number of loudspeakers 16 when a predetermined kb is provided as a condition.

Furthermore, the inventors derived, through a numerical acoustic analysis, the following formula as an index for the lower limit of the reduction amount of the acoustic power of the 0th-order circumferentially-generated lobe mode of a rotor blade sound source (m=0), when the number of loudspeakers 16 described above is employed.

$$att' = -20\log\left(\left|1 - \frac{j_0(kb)}{j_0(ka)}\right|\right) \quad \text{(Formula 6)}$$

(range evaluation formula where ka <1.6) where a is a length of the rotor blade 13 (radius of rotor blade), b=r×a represents a radius of a circle where the loudspeakers 16 are installed, k is an upper limit wavenumber, and $j_0$ is a spherical Bessel function. The inventors obtained the following formula wherein the range of ka of the above formula is not limited:

$$att = -20\log\left(\left|1 - \frac{j_0(1+X^2))}{j_0(1)}\right|\right) \quad \text{(Formula 7)}$$

where X is $$X = ka\sqrt{r-1} \quad \text{(Formula 8)}$$

The graph shown in FIG. 4 presents a relationship between the above formula 7 and the formula 8. In FIG. 4, the horizontal axis is X, and the vertical axis is an attenuation level (att). In the present embodiment, the radius of the circle where the loudspeakers 16 are installed can be easily estimated based on this evaluation formula.

Next, the operation of the present embodiment will be described.

A designer can determine the relationship between a target amount of reduction of acoustic power and X based on the graph shown in FIG. 4. Namely, it can be read that X should be smaller than 1.1 (X<1.1) in accordance with the curved line shown in FIG. 4, when attenuation of 6 dB is to be achieved as a target value of the reduction amount of the acoustic power of the 0th-order circumferentially-generated lobe mode of a rotor blade sound source (m=0). Likewise, it can be read that X should be smaller than 0.8 (X<0.8) in accordance with the curved line shown in FIG. 4, when attenuation of 10 dB is to be achieved as a target value of the reduction amount of the acoustic power of the 0th-order circumferentially-generated lobe mode of a rotor blade sound source (m=0). It can be read that X should be smaller than 0.5 (X<0.5) in accordance with the curved line shown in FIG. 4, when attenuation of 20 dB is to be achieved as a target value of the reduction amount of the acoustic power of the 0th-order circumferentially-generated lobe mode of a rotor blade sound source (m=0). As a result of determining the target reduction amount of the acoustic power in this manner, the value r can be automatically determined, and the conventional operation of determining, through trial and error based on experience, the radius of the circle where the loudspeakers 16 are installed can be omitted.

Next, the effectiveness of the case will be discussed where the "rate" represented by the above formula 5 of the present embodiment is 96% or more when the target value of the reduction amount of the acoustic power of the 0th-order circumferentially-generated lobe mode of a rotor blade sound source (m=0) is 10 dB, and the evaluation formulae 7 and 8 are satisfied. The effectiveness is considered by comparing it with a comparative example in which the number of loudspeakers is fixed to two. In the comparative example in which the number of loudspeakers 16 was two, an index kb for achieving 10 dB reduction was approximately kb<1.5.

Figure 5:
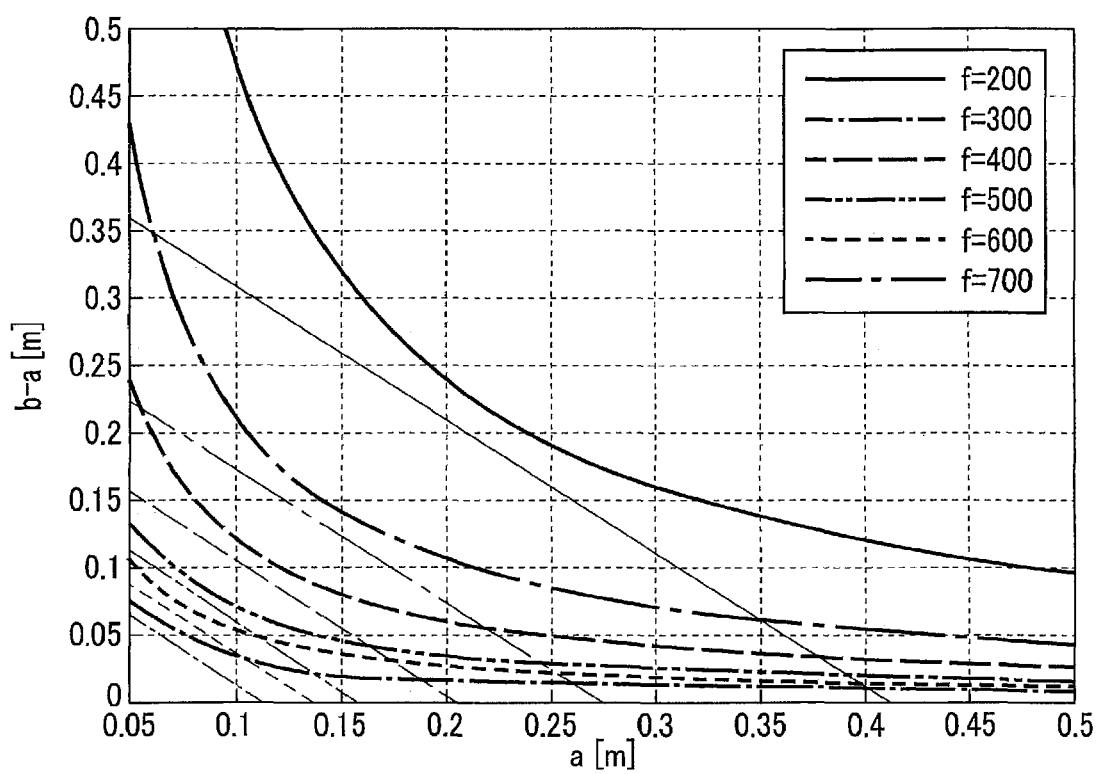
FIG. 5 is a graph showing a relationship between a comparative example in which the number of loudspeakers is two (kb=1.5) and an example of the present embodiment (X=0.8).

A result of the consideration is shown in FIG. 5. The comparative example, in which the number of loudspeakers 16 was fixed to two, is shown in FIG. 5, with kb=1.5 and a straight line having a negative slope (the broken line in FIG. 5). At this time, the wavenumber k is represented by (Formula 9)

$$k = \omega/c = 2\pi f/c$$

where ω is an angular velocity, f is a frequency, and c is a sound velocity; therefore, a value b−a varies according to an increase and decrease of the frequency f.

In FIG. 5, X needs to be smaller than 0.8 (X<0.8) so that the "rate" represented by the formula 5 is 96% or more, and the evaluation formulae 7 and 8 are satisfied. A curved line of X=0.8 is shown in FIG. 5. As apparent from FIG. 5, in the example of the present embodiment, that is, when the "rate" represented by the formula 5 was 96% or more, and the evaluation formulae 7 and 8 were satisfied, the value b—a was increased in all of the frequencies, as compared to the comparative example in which the number of loudspeakers 16 was two. This means that a difference between the radius b of the circle where the loudspeakers 16 are installed and the length of the rotor blade 13 (radius of the rotor blade) can be increased. Therefore, the example of the present embodiment can improve the flexibility in installing the loudspeakers 16, as compared to the comparative example.

Figure 6:
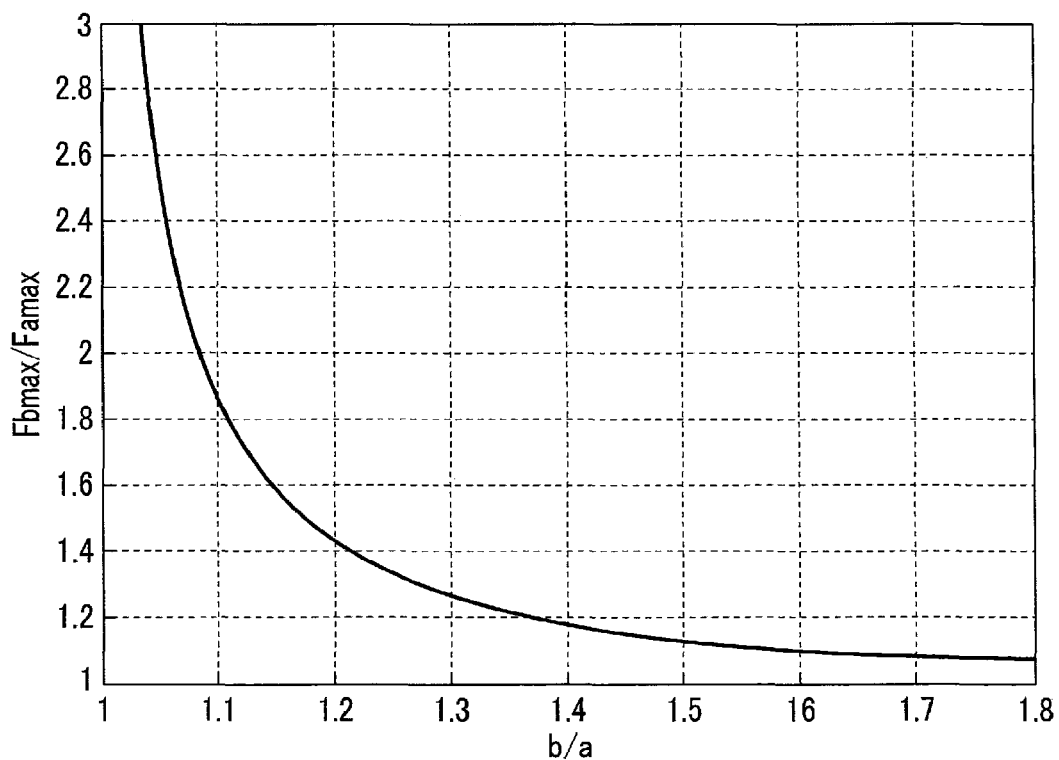

Another result of the consideration is shown in FIG. 6. In FIG. 6, an upper limit of a frequency Famax of the comparative example (wherein the number of loudspeakers is two) is defined as shown in the following formula based on a condition of kb=1.5

$$F_{amax} = \frac{1.5c}{2b\pi} \quad \text{(Formula 10))}$$

Likewise, an upper limit of a frequency Fbmax of the example of the present embodiment (the example in which the "rate" represented by the formula 5 is 96% or more, and the evaluation formulae 7 and 8 are satisfied, and the number of loudspeakers 16 is four) is defined as shown in the following formula based on a condition of X=0.8:

$$F_{bmax} = \frac{0.8c}{2a\pi\sqrt{b/a-1}} \quad \text{(Formula 11)}$$

Thereby, the ratio between Famax and Fbmax is defined as follows:

$$F_{bmax}/F_{amax} = \frac{0.8b/a}{1.5\sqrt{b/a-1}} \quad \text{(Formula 12)}$$

FIG. 6 shows a graph presenting a relationship between b/a and Fbmax/Famax, with b/a on the horizontal axis and Fbmax/Famax on the vertical axis. It can be understood from FIG. 6 that Fbmax/Famax is one or greater in all of b/a. Therefore, an upper limit of an applicable frequency can be increased in the example of the present embodiment (the example in which the "rate" represented by the formula 5 is 96% or more, and the evaluation formulae 7 and 8 are satisfied, and the number of loudspeakers 16 is four), as compared to the comparative example.

According to the present embodiment, the following can be accomplished. The system 11 for reducing interference noise of rotor and stator blades includes: the rotor blades 13 that rotate about the central axis 12; the stator blades 14 facing the rotor blades 13; the loudspeakers 16 that are discretely arranged on a circle having a center positioned on the central axis 12 and generate a control sound; one or more reference microphones 17; and the controller 18 that generates the control sounds of the same phase and the same amplitude from the loudspeakers 16 based on one or more signals acquired by one or more reference microphones 17. The evaluation formula of the attenuation level "att" is represented by $$att = -20\log\left(\left|1 - \frac{j_0(1-X^2))}{j_0(1)}\right|\right) \quad \text{(Formula 13)}$$

and X is defined as $$X = ka\sqrt{r-1} \quad \text{(Formula 14)}$$

where a is a length of the rotor blade 13, b is a radius of a circle where the loudspeakers 16 are installed, r=a/b, k is an upper limit wavenumber, $j_0$ is a spherical Bessel function, and r is selected from a target noise attenuation level based on "att" and X.

According to this configuration, determining the target reduction amount of the acoustic power makes it possible to automatically determine the value r and omit the conventional operation of determining, through trial and error based on experience, the radius of the circle where the loudspeakers 16 are installed. As a result, the design of the system 11 for reducing interference noise of rotor and stator blades can be simplified, and the level of operation performed by a designer can be reduced.

In this case, $B_n^m$ is defined as follows:

$$B_n^m = L_c k q_s \sqrt{\frac{2n+1}{4\pi}} \sqrt{\frac{(n-|m|)!}{(n+|m|)!}} j_n(kb) P_n^{|m|}(0) \quad \text{(Formula 15)}$$

where $L_c$ is the number of loudspeakers 16, k is an upper limit wavenumber, b is a radius of a circle where the loudspeakers 16 are installed, $q_s$ is a volume velocity of the loudspeakers 16, n is an elevation angle mode number, m is a lobe mode number, $j_n$ is a spherical Bessel function, $P_n|m|$ is an associated Legendre function. The "rate" is defined as follows:

$$\text{rate} = \sum_{j=0}^{na} |B_{0+2j}^0|^2 \bigg/ \sum_{i=-ma}^{ma} \sum_{j=0}^{na} |B_{|L_c \times i|+2j}^{0+L_c \times i}|^2 \quad \text{(Formula 16)}$$

where na is an integer representing an upper limit of the elevation angle mode number, ma is an integer representing an upper limit of the lobe mode number, the condition of $L_c$ is selected based on kb determined from above k and r so that the "rate" defined above is 96% or more.

The configuration described above is very effective in that it can be used as an index for easily calculating the suitable number of loudspeakers 16 when a predetermined kb is provided as a condition. Also, it is possible to strike a balance between the cost required for installing the loudspeakers 16, etc., and sufficient reduction of the acoustic power of noise. Namely, if the "rate" is close to 100%, a great number of loudspeakers 16 are needed, which is an unrealistic solution when installation costs are considered. On the other hand, if the "rate" is smaller than 96%, the acoustic power of the 0th-order circumferentially-generated lobe mode of a rotor blade sound source (m=0) cannot be sufficiently reduced. The present embodiment resolves these issues and can achieve the system 11 for reducing interference noise of rotor and stator blades that can be produced at a low cost and exhibits favorable control effects.

In this case, the aforementioned $L_c$ is three or more. According to this configuration, the value b−a can be increased, and as a result the loudspeakers 16 can be installed at a position away from the rotor blade 13. Therefore, the flexibility in installing the loudspeakers 16 can be improved, as compared to a case where the number of loudspeakers 16 is two. In addition, since Fbmax/Famax can be one or greater in all of b/a, an upper limit of an applicable frequency can be increased, as compared to the case where the number of loudspeakers 16 is two. Therefore, the active noise control that is originally effective for reducing noise of low frequency can be applied to noise of higher frequency without increasing the number of loudspeakers 16 too much. Accordingly, an upper limit of an applicable frequency can be increased, and a user-friendly system 11 for reducing interference noise of rotor and stator blades can be achieved.

In this case, one or more reference microphones 17 are arranged at a position away from the rotor blades 13 at a predetermined distance on the central axis 12. According to this configuration, a position to install the reference microphone 17 can be easily determined, and the workload on the designer can be reduced.

First Example

Figure 7:
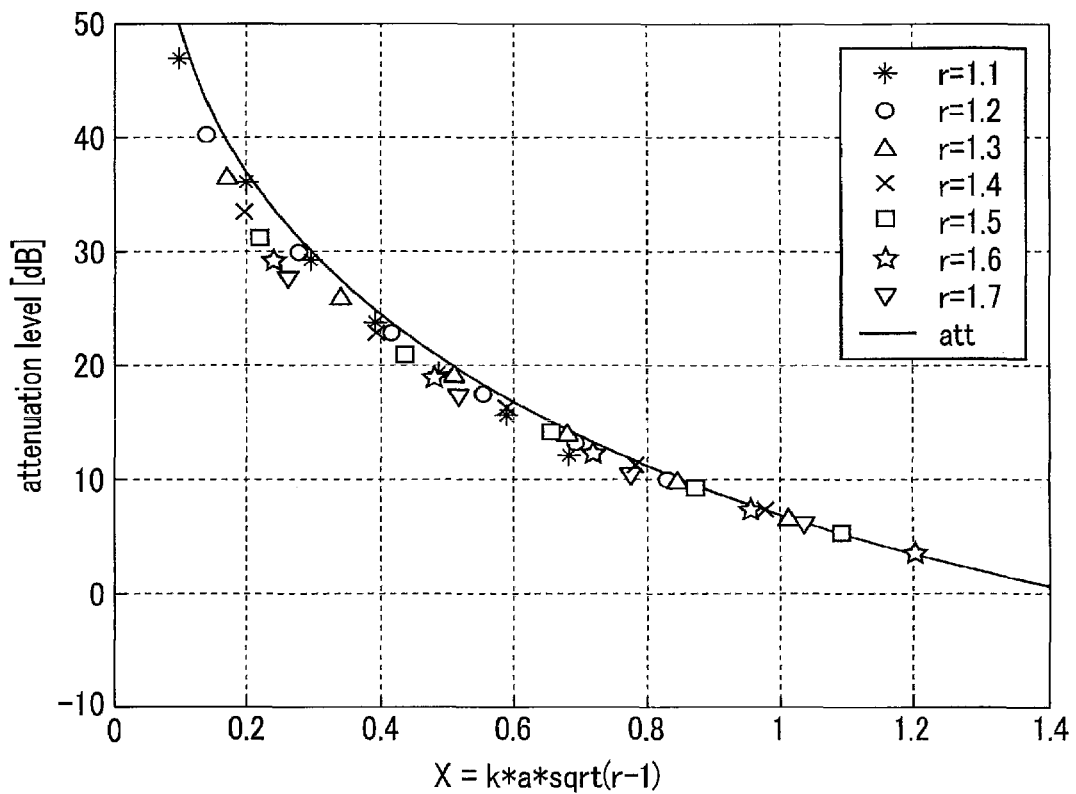
FIG. 7 is a graph showing "att" where the number of loudspeakers is four, and an amount of reduction of an acoustic power of a 0th-order circumferentially-generated lobe mode of a rotor blade sound source (m=0), where r is a suitable value ranging from 1.1 to 1.7.

In a first example, the following conditions are set: a=0.14 m; the frequency of noise generated is 120 Hz or greater satisfying kb<2.5; the radius b of the circle where the loudspeakers 16 are installed (r=1.1 to 1.7); the number of loudspeakers 16 is four; kb<2.5; the reference microphone 17 is arranged on the extended line 25 of the central axis 12; and the distance L from the end surface 24 of the duct 15 to the reference microphone 17 is eight times a, that is, L=8a. FIG. 7 shows the evaluation formula "att", represented by the above formulae 7 and 8, and the reduction amount of the acoustic power of the 0th-order circumferentially-generated lobe mode of a rotor blade sound source (m=0), where r is a suitable value ranging from 1.1 to 1.7. The horizontal axis represents X, and the vertical axis represents the reduction amount of the acoustic power of the 0th-order circumferentially-generated lobe mode of a rotor blade sound source (m=0). As apparent from FIG. 7, it can be understood that for each of the values r, the results of the reduction amount of the acoustic power of the 0th-order circumferentially-generated lobe mode of a rotor blade sound source (m=0) are arranged along the curved line represented by the evaluation formula "att". Therefore, it can be understood that the evaluation formula "att", represented by the formulae 7 and 8, can actually be used as an indicator of the reduction amount of the acoustic power of the 0th-order circumferentially-generated lobe mode of a rotor blade sound source (m=0).

Second Example

Figure 8:
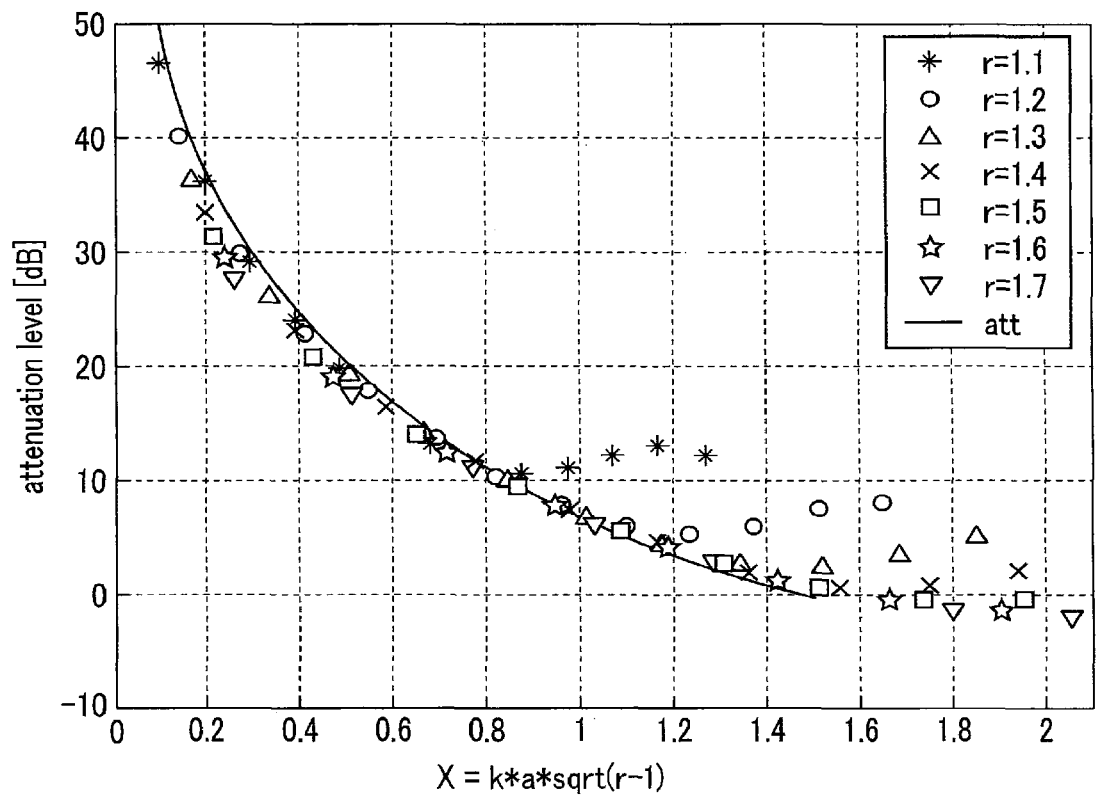
FIG. 8 is a graph showing "att" where the number of loudspeakers is six, and an amount of reduction of an acoustic power of a 0th-order circumferentially-generated lobe mode of a rotor blade sound source (m=0), where r is a suitable value ranging from 1.1 to 1.7.

In a second example, the following conditions are set: a=0.14 m; the frequency of noise generated is 120 Hz or greater satisfying kb<4.5; the radius b of the circle where the loudspeakers 16 are installed (r=1.1 to 1.7); the number of loudspeakers 16 is six; kb<4.5; the reference microphone 17 is arranged on the extended line 25 of the central axis 12; and L=8a. FIG. 8 shows the evaluation formula "att", represented by the above formulae 7 and 8, and the reduction amount of the acoustic power of the 0th-order circumferentially-generated lobe mode of a rotor blade sound source (m=0), where r is a suitable value ranging from 1.1 to 1.7. The horizontal axis represents X, and the vertical axis represents the reduction amount of the acoustic power of the 0th-order circumferentially-generated lobe mode of a rotor blade sound source (m=0). As apparent from FIG. 8, it can be understood that for each of the values r, the results of the reduction amount of the acoustic power of the 0th-order circumferentially-generated lobe mode of a rotor blade sound source (m=0) are arranged along the curved line represented by the evaluation formula "att". The results of the reduction amount of the acoustic power of the 0th-order circumferentially-generated lobe mode of a rotor blade sound source (m=0) for the case where r is 1.1 to 1.3 are shown above the curved line represented by the evaluation formula "att" in the range of X>1. However, the evaluation formula "att" can also be considered as an indicator of a lower limit of the reduction amount of the acoustic power of the 0th-order circumferentially-generated lobe mode of a rotor blade sound source (m=0). Namely, a minimum reduction amount of the acoustic power of the 0th-order circumferentially-generated lobe mode of a rotor blade sound source (m=0) that satisfies the evaluation formula "att" is secured by designing the system 11 for reducing interference noise of rotor and stator blades based on the evaluation formula "att". Therefore, it can be understood that under the conditions of the second example as well, the evaluation formula "att" can actually be used as an indicator of the reduction amount of the acoustic power of the 0th-order circumferentially-generated lobe mode of a rotor blade sound source (m=0).

In a second embodiment introduced below, mainly the parts different from those of the first embodiment will be described, and description and graphic illustration of the parts identical to those of the first embodiment will be omitted.

Second Embodiment

In the first embodiment, one reference microphone 17 is installed on the central axis 12, to implement the active noise control. However, it is sometimes difficult to install the reference microphone 17 on the central axis 12. In the second embodiment, a case where the reference microphone 17 is installed near the rotor blade 13 in the system 11, for the purpose of reducing interference noise of rotor and stator blades, will be described with reference to FIGS. 9 to 11.

Figure 9:
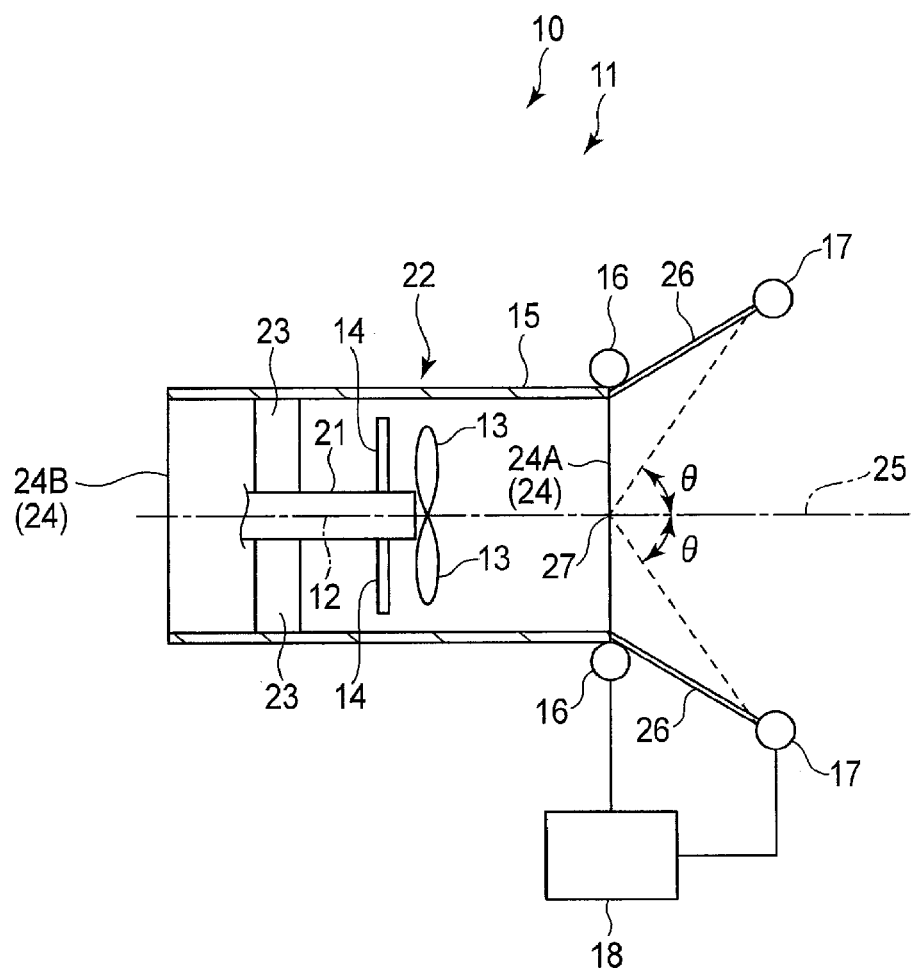
FIG. 9 is a schematic diagram showing rotor blades, stator blades, a duct, loudspeakers, reference microphones, and a controller of a system for reducing interference noise of rotor and stator blades of a second embodiment.

As shown in FIG. 9, the flight vehicle 10 of the second embodiment includes the system 11 for reducing interference noise of rotor and stator blades.

The system 11 for reducing interference noise of rotor and stator blades includes: the central axis 12 (rotary shaft); the rotor blades 13 that rotate about the central axis 12; the stator blades 14 facing the rotor blades 13; the tubular (cylindrical) duct 15 surrounding the rotor blades 13 and the stator blades 14; the loudspeakers 16 (control loudspeakers); reference microphones 17 that acquire an interference noise emitted from the rotor blades 13 and the stator blades 14 and a control sound emitted from the loudspeakers 16; and the controller 18 that controls the loudspeakers 16. When the rotary shaft 21, to which the rotor blades 13 are attached, is configured in a rod shape having a large diameter, as in the present embodiment, the central axis 12 is defined as an axis passing through the center of the rotary shaft. The central axis 12, the rotor blades 13, the stator blades 14, and the duct 15 described above can form a part of a gas turbine engine (jet engine), an example of which is a fan 22 with a compressor.

In accordance with the condition of "rate" >96% of the formula 5 of the first embodiment, the number of loudspeakers 16 satisfies both this condition and also the condition of kb. Thereby, generation of the above-described additional lobe mode (additional aliasing mode) can be suppressed in the present embodiment as well. The loudspeakers 16 may be directly fixed to the outside of the duct 15 via a jig or another fixing member.

The controller 18 uses an average of the signals of one or more reference microphones 17.

The reference microphones 17 are fixed to the duct via a supporting member 26 (such as a rod-shaped member or a jig). The supporting member 26 radially extends from the duct 15 to the outside. The reference microphones 17 are discretely arranged on a circle that has a center positioned on the central axis 12. The reference microphones 17 are arranged on the circle with an equal space between them. A point at which the end surface 24 of the duct 15 and the central axis 12 intersect each other, that is, an elevation angle of the reference microphones 17 as viewed from a center 27 of an opening, is defined as θ. The number of reference microphones 17 is preferably three or more. Thereby, rotating sound sources (rotor blade sound sources) of the same phase, which is a characteristic of a noise source, can be properly obtained even when there is ambient reflection.

More specifically, the number of reference microphones 17 arranged satisfies the following formula:

$$N \times L_m \neq L_c \quad \text{(Formula 17)}$$

where N is a suitable integer, $L_m$ is the number of reference microphones 17, and $L_c$ is the number of loudspeakers 16. Therefore, the number of reference microphones 17 and the number of loudspeakers 16 are not the same. As a result, the angle of orientation of the arranged loudspeakers 16 and the angle of orientation of the arranged reference microphones 17 may differ from each other. Accordingly, it is possible to prevent a circumstance where the loudspeakers 16 and the reference microphones 17 are arranged at the same angle of orientation, leading to the reference microphones 17 being strongly affected by a proximate sound field due to the loudspeakers 16 near the reference microphones 17.

Specifically, when the number of loudspeakers 16 is four, the number of reference microphones 17 is set to three, and when the number of loudspeakers 16 is six, the number of reference microphones 17 is set to four. Also, since the present embodiment employs ring microphones of the same phase, the output of these ring microphones takes an arithmetic mean of the output of the respective reference microphones 17.

In the present embodiment, the elevation angle of the reference microphones 17 is set so that $J(\theta_a)$ of the following evaluation formula is minimized:

$$J(\theta_a) = 10 \log \int_0^{\pi/2} \left| K(\theta_a) \sum_{i=0}^{na} Pringc_{2i}^0(\theta) - \sum_{i=0}^{na} Pringp_{2i}^0(\theta) \right|^2 d\theta \quad \text{(Formula 18)}$$

where $K(\theta_a)$ satisfies $$K(\theta_a) \sum_{i=0}^{na} Pringc_{2i}^0(\theta_a) = \sum_{i=0}^{na} Pringp_{2i}^0(\theta_a) \quad \text{(Formula 19)}$$

where the following formulae are presented:

$$Pringp_n^0(\theta_a) = \sum_{i=1}^{Lm} \omega \rho A_n^0 h_n(kr_a) Y_n^m(\theta_a, \phi_{ai}) / L_m \quad \text{(Formula 20)}$$

$$A_n^0 = L_p k q_p \sqrt{\frac{1+2n}{4\pi}} \, j_n(ka) P_n^0(0) \quad \text{(Formula 21)}$$

$$Pringc_n^0(\theta_a) = \sum_{i=1}^{Lm} \omega \rho B_n^0 h_n(kr_a) Y_n^m(\theta_a, \phi_{ai}) / L_m \quad \text{(Formula 22)}$$

$$B_n^0 = L_c k q_s \sqrt{\frac{1+2n}{4\pi}} \, j_n(kb) P_n^0(0) \quad \text{(Formula 23)}$$

na is a high-order elevation angle mode number under consideration, and is approximately 4. Pringp is a sound pressure at which the reference microphones 17 (ring microphones) arranged in a ring form acquire sound waves of (m, n)=(0, 0), (0, 2), (0, 4) . . . , (0, 2×na) mode generated from noise sources (sound sources of the same phase, rotor blade sound sources). Pringc is a sound pressure at which the reference microphones 17 (ring microphones) arranged in a ring form acquire sound waves of (m, n)=(0, 0), (0, 2), (0, 4) . . . , (0, 2×na) mode generated from loudspeakers (control sound sources) arranged in a ring form. i (i=1, 2, 3 . . . ) is a sound source number, a loudspeaker number, or a reference microphone number. $r_a$ is a distance from the center 27 of the opening to the reference microphones 17. $\theta_a$ is an elevation angle of installation of the reference microphones 17 viewed from the center 27 of the opening. $\phi_{ai}$ is an angle of orientation of installation of the reference microphones 17 viewed from the center 27 of the opening. ω is an angular velocity. ρ is a density of gas. $h_n$ is an n-order second class spherical Hankel function. Y is spherical surface harmonics. $L_p$ is the number of noise sources that is assumed to be sufficiently large. $q_p$ is a volume velocity of the noise source. $j_n$ is an n-order spherical Bessel function. P is an associated Legendre function. $q_s$ is a volume velocity of the loudspeaker. $\phi_{ai}=(2\pi i)/L_m$. Therefore, when the total number of reference microphones 17 is three, the reference microphones 17 are installed at the angles of orientation of 0 degree, 120 degrees, and 240 degrees, respectively, as viewed from the center 27 of the opening.

The evaluation function J of the formula 18 includes an integral, but may be substituted by a result of the summation of values calculated in a sufficiently small angle range.

The function of the present embodiment will be described below.

In the present embodiment, in accordance with the condition of "rate" ≥96% of the formula 5 of the first embodiment, the number of loudspeakers 16 satisfies both this condition and also the condition of kb of the first embodiment.

Therefore, generation of the above-described additional lobe mode (additional aliasing mode) is suppressed in the present embodiment as well.

Further, in the present embodiment, the elevation angle of the reference microphones 17 is set so that $J(\theta_a)$ of the above formula 18 is minimized. As a result, the difference between the high-order elevation angle mode generated from a noise source (rotor blade 13) and the high-order elevation angle mode generated from the loudspeakers 16 (control sound sources) becomes minimal. Accordingly, the reference microphones (ring microphones) can be installed at a position of an elevation angle where the influence of interference of sound waves other than the (0, 0) mode is small. Thereby, the control effect (effect of reducing noise) is maximized.

As will be described in Examples 3 and 4 below, the evaluation function $J(\theta_a)$ of the formula 18 often reaches a minimum within a range of 1.0 to 1.5 rad. Therefore, the elevation angle of installation of the reference microphones 17 can be simply set within a range of 0.9 to 1.3 rad, preferably within a range of 1.0 to 1.3 rad, and more preferably within a range of 1.1 to 1.3 rad, without using this evaluation function $J(\theta_a)$. This also allows the reference microphones 17 to be installed at a position of an elevation angle where the influence of interference of sound waves other than the (0, 0) mode is small.

THIRD EXAMPLE

In a third example, the following conditions are set: a=0.14 m; b=r×a, where the radius b of a circle where the loudspeakers 16 are installed; the number of loudspeakers 16 is four; $r_a$=c=1.2b, where the distance $r_a$ from the center 27 of the opening to the reference microphones 17; and the number of reference microphones 17 is three.

Figure 10:
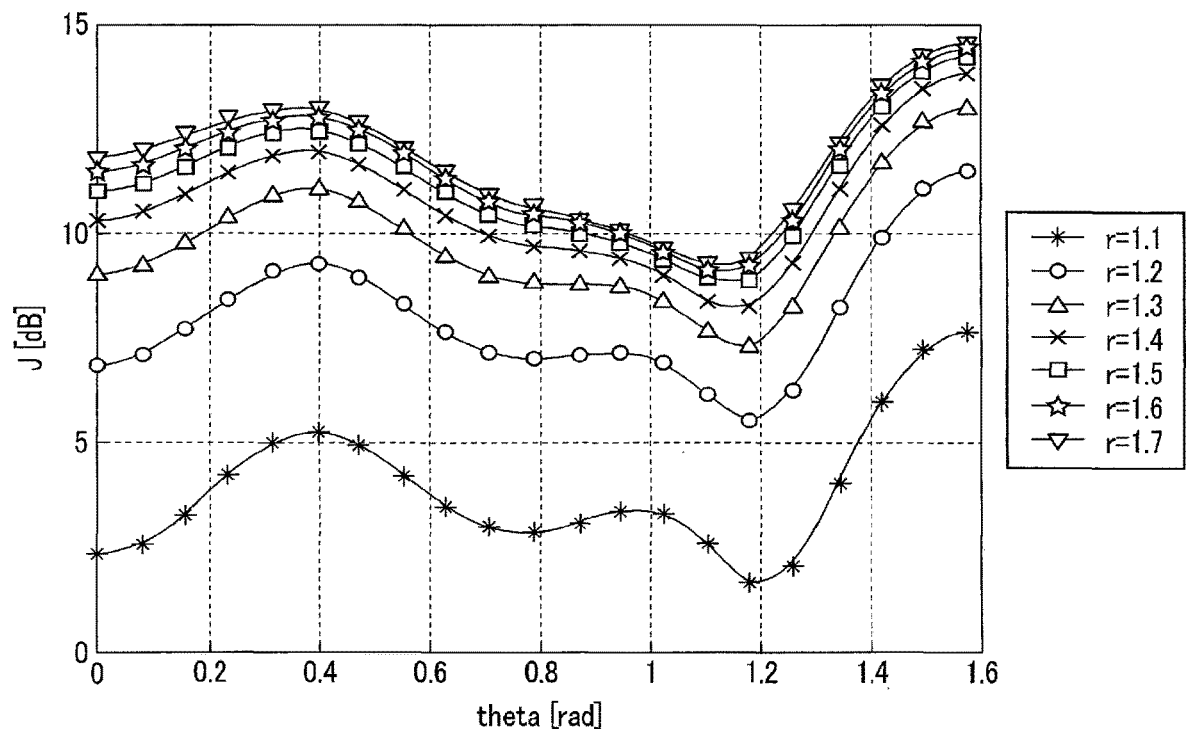
FIG. 10 is a graph plotting an evaluation function J ($\theta_a$) when r takes each value of 1.1 to 1.7, and the frequency of a noise generated by a noise source and a control sound generated by the loudspeaker is 120 Hz.
Figure 11:
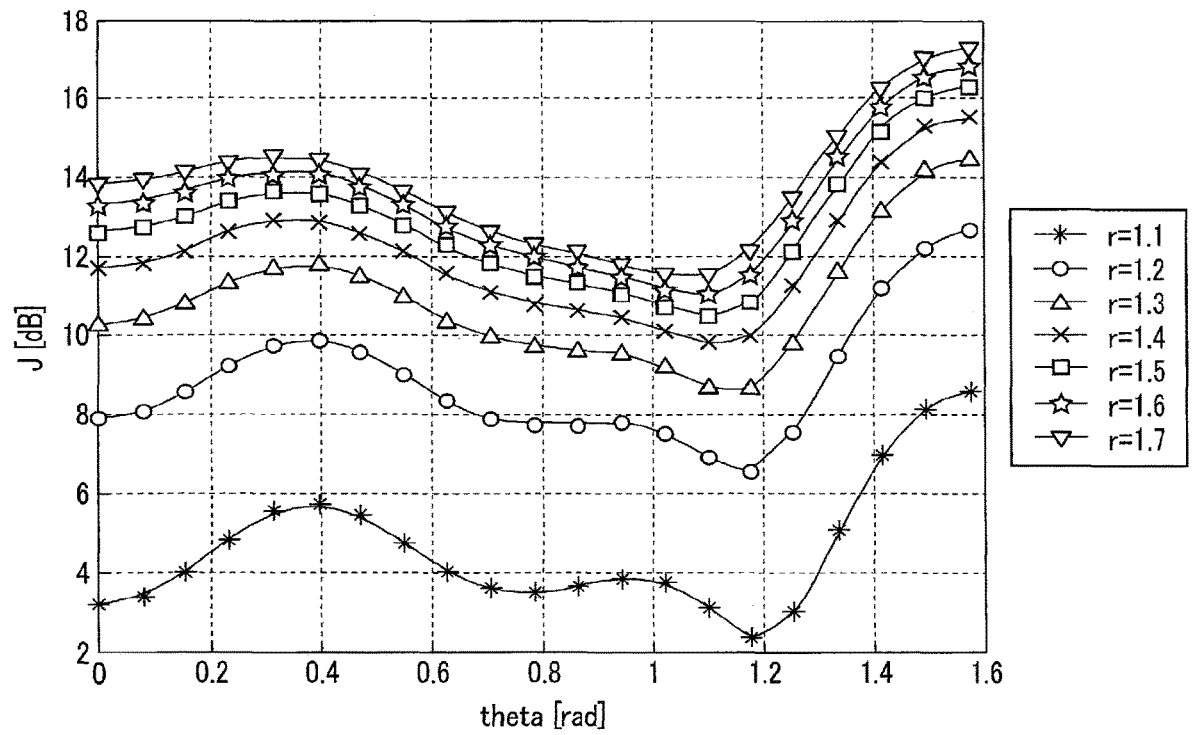
FIG. 11 is a graph plotting an evaluation function J ($\theta_a$) when r takes each value of 1.1 to 1.7, and the frequency of a noise generated by a noise source and a control sound generated by the loudspeaker is 240 Hz.

FIGS. 10 and 11 show the results of plotting the evaluation function $J(\theta_a)$ of the formula 18 when r takes each value of 1.1 to 1.7. FIG. 10 shows the results obtained when the frequency of the noise generated and the control sound generated by the loudspeakers 16 is 120 Hz, and FIG. 11 shows the results obtained when the frequency of the noise generated and the control sound generated by the loudspeakers 16 is 240 Hz.

It was confirmed that in all the results shown in FIGS. 10 and 11 the evaluation function $J(\theta_a)$ took a minimum value in the vicinity of 1.2 rad.

Figure 12:
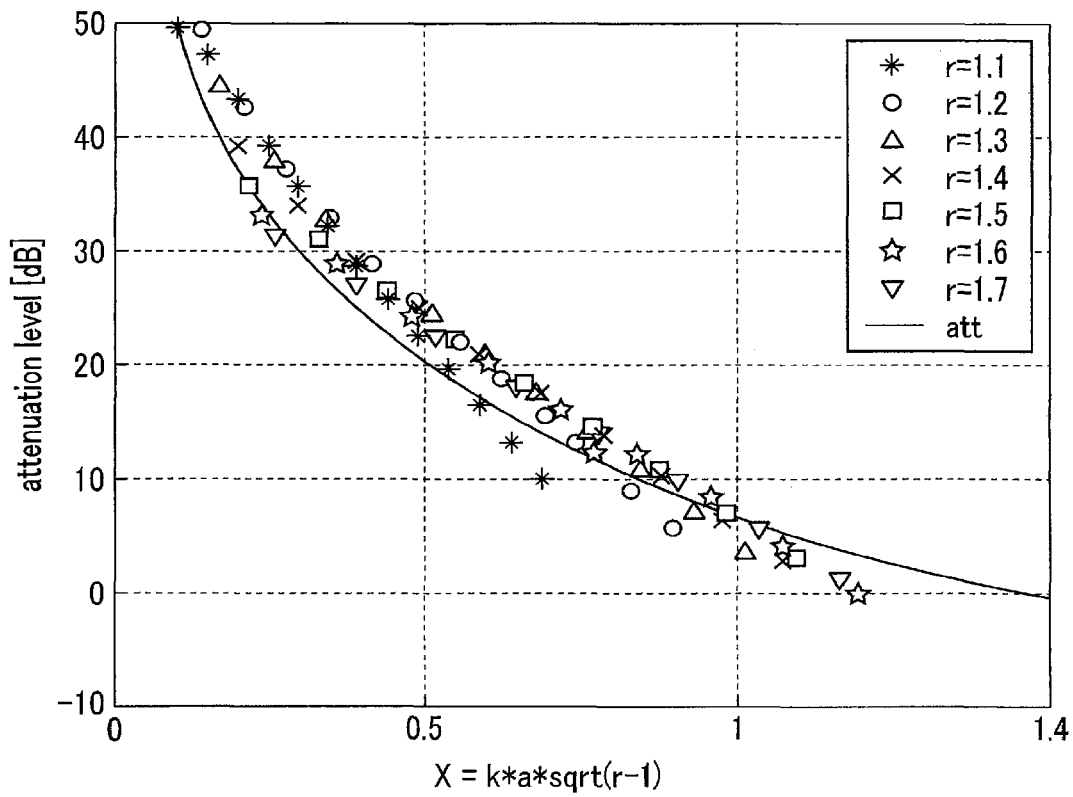
FIG. 12 is a graph showing a relationship between "att" of the first embodiment and an amount of reduction of an acoustic power of a 0th-order circumferentially-generated lobe mode of a rotor blade sound source (m=0) when an elevation angle of installation of the reference microphone is set to 1.2 rad, and r takes each value of 1.1 to 1.7.

FIG. 12 shows the relationship between the reduction amount of the acoustic power of the 0th-order circumferentially-generated lobe mode of a rotor blade sound source (m=0) and "att" of the formula 7 of the first embodiment when the elevation angle of the reference microphones 17 is set to 1.2 rad, and r takes each value of 1.1 to 1.7. It was confirmed that regardless of the value r takes, the reduction amount of the acoustic power of the 0th-order circumferentially-generated lobe mode of a rotor blade sound source (m=0) takes a value generally close to "att". Therefore, in the third example, the amount of reduction corresponding to the reduction amount of the acoustic power of the 0th-order circumferentially-generated lobe mode of a rotor blade sound source (m=0), estimated based on the evaluation formula "att", was obtained by minimizing the influence of the interference of the sound waves of the high-order elevation angle mode generated from the noise source and the loudspeakers 16.

FOURTH EXAMPLE

Figure 13:
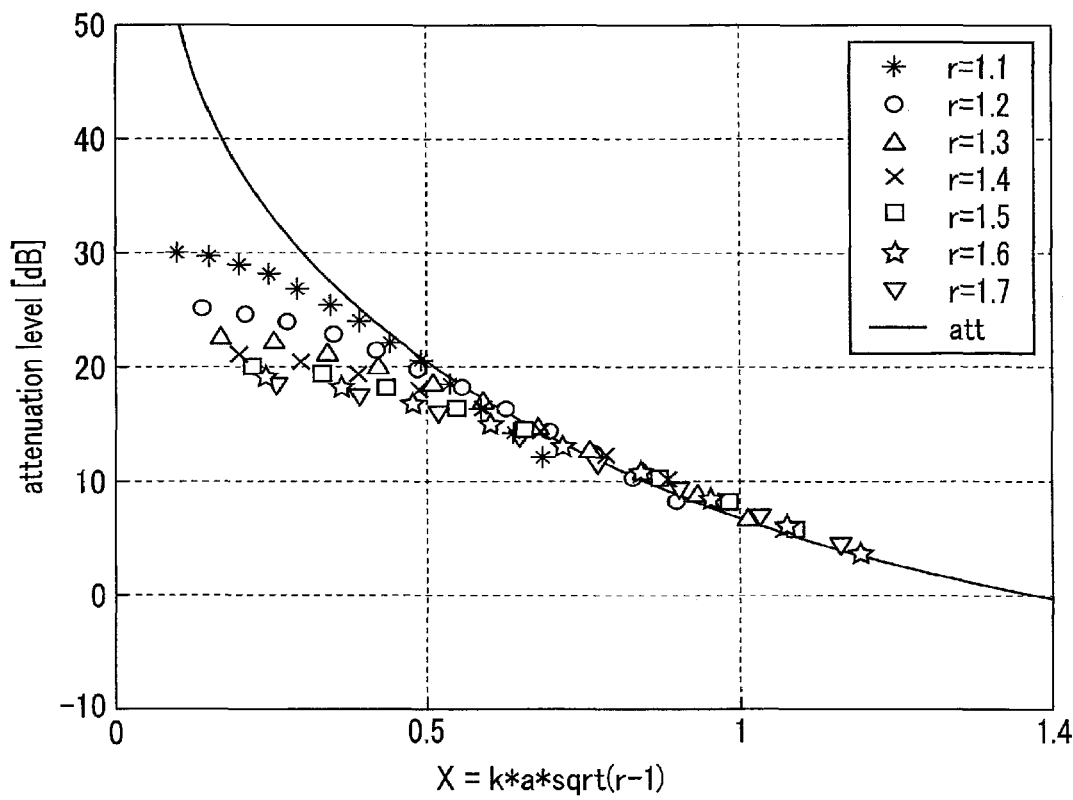
FIG. 13 is a graph showing a relationship between "att" of the first embodiment and an amount of reduction of an acoustic power of a 0th-order circumferentially-generated lobe mode of a rotor blade sound source (m=0), when an elevation angle of installation of the reference microphone is set to 0.8 rad and r takes each value of 1.1 to 1.7.

FIG. 13 shows the relationship between the reduction amount of the acoustic power of the 0th-order circumferentially-generated lobe mode of a rotor blade sound source (m=0) and "att" of the formula 7 of the first embodiment when the elevation angle of the reference microphone is set to 0.8 rad, and r takes each value of 1.1 to 1.7 under the same conditions as those of the third embodiment.

In particular, the tendency of the reduction amount to be smaller than the reduction amount of the acoustic power of the 0th-order circumferentially-generated lobe mode of a rotor blade sound source (m=0), estimated based on the evaluation formula "att" in a range where X is 0.5 or less, was confirmed. Therefore, in the present example, it was confirmed that the setting of the elevation angle of the reference microphones 17 was not appropriate and that the influence of the interference of the sound waves of the high-order elevation angle mode increased. Accordingly, it was confirmed that to sufficiently reduce the acoustic power of the 0th-order circumferentially-generated lobe mode of a rotor blade sound source (m=0), it is necessary to set a suitable elevation angle θ that minimizes $J(\theta_a)$ of the above formula 18.

According to the present embodiment and Examples 3 and 4, the following can be accomplished.

When the duct 15 surrounding the rotor blades 13 and the stator blades 14 is provided, $L_m$ is the number of reference microphones, and N is a suitable integer, the following formula is satisfied, and $L_m$ is three or greater:

$$N \times L_m \neq L_c \quad \text{(Formula 24)}$$

When one or more reference microphones 17 are discretely arranged on a circle that has a center positioned on the extended line 25 of the central axis 12, and the elevation angle of one or more reference microphones 17 as viewed from the point at which the extended line 25 and the end surface 24 of the duct 15 intersect each other is defined as $\theta_a$, one or more reference microphones 17 are arranged at $\theta_a$ to make the following close to a minimum value, $$J(\theta_a) = \quad \text{(Formula 25)}$$

$$10\log \int_0^{\pi/2} \left| K(\theta_a) \sum_{i=0}^{na} Pring c_{2i}^0(\theta_a) - \sum_{i=0}^{na} Pring p_{2i}^0(\theta_a) \right|^2 d\theta$$

where $K(\theta_a)$ satisfies the following formula:

$$K(\theta_a) \sum_{i=0}^{na} Pring c_{2i}^0(\theta_a) = \sum_{i=0}^{na} Pring p_{2i}^0(\theta_a) \quad \text{(Formula 26)}$$

where the following formulae are presented:

$$Pring p_n^0(\theta_a) = \sum_{i=1}^{Lm} \omega \rho A_n^0 h_n(kr_a) Y_n^m(\theta_a, \phi_{ai})/L_m \quad \text{(Formula 27)}$$

$$A_n^0 = L_p k q_p \sqrt{\frac{1+2n}{4\pi}} j_n(ka) P_n^0(0) \quad \text{(Formula 28)}$$

$$Pring c_n^0(\theta_a) = \sum_{i=1}^{Lm} \omega \rho B_n^0 h_n(kr_a) Y_n^m(\theta_a, \phi_{ai})/L_m \quad \text{(Formula 29)}$$

$$B_n^0 = L_c k q_s \sqrt{\frac{1+2n}{4\pi}} j_n(kb) P_n^0(0) \quad \text{(Formula 30)}$$

and the controller 18 uses an average of the signals of one or more reference microphones 17.

According to this configuration, even when it is difficult to install the reference microphone(s) 17 on the extended line 25 of the central axis 12, it is possible to install the reference microphone(s) 17 around the end surface 24 of the duct 15, and at a position where the influence of the interference of the sound waves of the high-order elevation angle mode generated from the noise source and the loudspeakers 16 is minimized. As a result, it is possible to reduce the workload on the designer when considering the elevation angle of the installation of the reference microphones 17, and thereby obtain a sufficient control effect, that is, the effect of reducing the acoustic power of the 0th-order circumferentially-generated lobe mode of a rotor blade sound source (m=0).

In this case, when the duct 15 surrounding the rotor blades 13 and the stator blades 14 is provided, $L_m$ is the number of reference microphones, and N is a suitable integer, the following formula is satisfied, and $L_m$ is three or greater:

$$N \times L_m \neq L_c \quad \text{(Formula 31)}$$

One or more reference microphones 17 are discretely arranged on a circle that has a center positioned on the extended line 25 of the central axis 12, the elevation angle of one or more reference microphones 17 as viewed from the point at which the extended line 25 and the end surface 24 of the duct 15 intersect each other is set to 0.9 to 1.3 rad, and the controller 18 uses an average of the signals of one or more reference microphones 17.

According to this configuration, it is possible to set the elevation angle of the installation of the reference microphones 17 more simply without using the evaluation function J. As a result, it is possible to reduce the workload on the designer and also obtain a certain level of control effect, that is, the effect of reducing the acoustic power of the 0th-order circumferentially-generated lobe mode of a rotor blade sound source (m=0).

The case where the system 11 for reducing interference noise of rotor and stator blades of the present embodiment is applied to the fan 22 with a compressor of the flight vehicle 10 is described as an example; however, the fan 22 to which the system 11 for reducing interference noise of rotor and stator blades is applied is not limited thereto. The system 11 for reducing interference noise of rotor and stator blades of the present embodiment may also be applied to, for example, a turbofan, an industrial fan, a fan used in a moving vehicle other than the flight vehicle 10, and other general fans. It is also possible to combine the system 11 for reducing interference noise of rotor and stator blades of the first embodiment and the system 11 for reducing interference noise of rotor and stator blades of the second embodiment to achieve a single system 11 for reducing interference noise of rotor and stator blades.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system for reducing interference noise of rotor and stator blades, the system comprising:
   a plurality of rotor blades configured to rotate about a central axis;
   a plurality of stator blades facing the rotor blades;
   a plurality of loudspeakers discretely arranged on a circle that has a center positioned on the central axis, each loudspeaker configured to generate a control sound;
   one or more reference microphones; and
   a controller configured to cause the loudspeakers to generate control sounds of a same phase and a same amplitude based on one or more signals acquired by the one or more reference microphones, the control sounds corresponding to the loudspeakers, the control sounds including the control sound,
   wherein:
   an evaluation formula of an attenuation level att concerning the interference noise is represented by $$att = -20\log\left(\left|1 - \frac{j_0(1-X^2))}{j_0(1)}\right|\right) \quad \text{(Formula 1)}$$

and X is represented by $$X = ka\sqrt{r-1} \quad \text{(Formula 2)}$$

where a is a length of the rotor blades, b is a radius of the circle, r=b/a, k is an upper limit wavenumber, and $j_0$ is a spherical Bessel function, and the r is selected based on a preset att, the X, and the k, the preset aft being determined as a target noise attenuation level.

2. The system according to claim 1, wherein $B_n^m$ is defined as follows:

$$B_n^m = L_c k q_s \sqrt{\frac{2n+1}{4\pi}} \sqrt{\frac{(n-|m|)!}{(n+|m|)!}} j_n(kb) P_n^{|m|}(0) \quad \text{(Formula 3)}$$

where $L_c$, is a number of the loudspeakers, k is an upper limit wavenumber, $q_c$ is a volume velocity of the loudspeakers, n is an elevation angle mode number, m is a lobe mode number, $j_n$ is a spherical Bessel function, $P_n|m|$ is an associated Legendre function, and
wherein a rate is defined as follows:

$$\text{rate} = \sum_{j=0}^{na} |B_{0+2j}^0|^2 \bigg/ \sum_{i=-ma}^{ma} \sum_{j=0}^{na} |B_{|L_c \times i|+2j}^{0+L_c \times i}|^2 \quad \text{(Formula 4)}$$

where na is an integer representing an upper limit of the elevation angle mode number, and ma is an integer representing an upper limit of the lobe mode number, and wherein a condition of $L_c$ is selected based on kb determined from the k and the r so that the rate defined above is 96% or more.

3. The system according to claim 2, wherein the $L_c$, is three or greater.

4. The system according to claim 3, wherein the one or more reference microphones are arranged at a position away from the rotor blades at a predetermined distance for one microphone.

5. The system according to claim 2, wherein the one or more reference microphones are arranged at a position away from the rotor blades at a predetermined distance for one microphone.

6. The system according to claim 1, wherein the one or more reference microphones are arranged at a position away from the rotor blades at a predetermined distance for one microphone.

7. The system according to claim 1, further comprising a duct surrounding the rotor blades and the stator blades, wherein when $L_m$ is a number of the reference microphones, and N is an integer, a following formula is satisfied:

$$N \times L_m \neq L_c \quad \text{(Formula 5)}$$

and $L_m$ is three or greater, wherein when the reference microphones are discretely arranged on a circle having a center positioned on the central axis, and an elevation angle of the reference microphones as viewed from a point at which the central axis and an end surface of the duct intersect each other is defined as $\theta_a$, the reference microphones are arranged at $\theta_a$, to make the following closer to a minimum value within a predetermined range:

$$J(\theta_a) = \quad \text{(Formula 6)}$$

$$10\log \int_0^{\pi/2} \left| K(\theta_a) \sum_{i=0}^{na} Pringc_{2i}^0(\theta_a) = \sum_{i=0}^{na} Pringp_{2i}^0(\theta_a) \right|^2 d\theta$$

where $K(\theta_a)$ satisfies a following formula:

$$K(\theta_a) \sum_{i=0}^{na} Pringc_{2i}^0(\theta_a) = \sum_{i=0}^{na} Pringp_{2i}^0(\theta_a) \quad \text{(Formula 7)}$$

where following formulae are presented:

$$Pringp_n^0(\theta_a) = \sum_{i=1}^{Lm} \omega \rho A_n^0 h_n(kr_a) Y_n^m(\theta_a, \phi_{ai}) / L_m \quad \text{(Formula 8)}$$

-continued $$A_n^0 = L_p k q_p \sqrt{\frac{1+2n}{4\pi}} j_n(ka) P_n^0(0) \quad \text{(Formula 9)}$$

$$Pringc_n^0(\theta_a) = \sum_{i=1}^{Lm} \omega \rho B_n^0 h_n(kr_a) Y_n^m(\theta_a, \phi_{ai}) / L_m \quad \text{(Formula 10)}$$

$$B_n^0 = L_c k q_s \sqrt{\frac{1+2n}{4\pi}} j_n(kb) P_n^0(0) \quad \text{(Formula 11)}$$

wherein the controller is configured to use an average of signals of the reference microphones.

8. The system according to claim 1, further comprising a duct surrounding the rotor blades and the stator blades, wherein when $L_m$, is a number of the reference microphones, and N is an integer, a following formula is satisfied:

$$N \times L_m \neq L_c \quad \text{(Formula 12)}$$

and $L_m$ is three or greater, wherein the reference microphones are discretely arranged on a circle having a center positioned on the central axis, and an elevation angle of the reference microphones, as viewed from a point at which the central axis and an end surface of the duct intersect each other, is 0.9 to 1.3 rad, wherein the controller is configured to use an average of signals of the reference microphones.

9. A flight vehicle comprising the system according to claim 1.

* * * * *